O. V. SMITH.
AUXILIARY BANKING MEANS.
APPLICATION FILED NOV. 25, 1918.

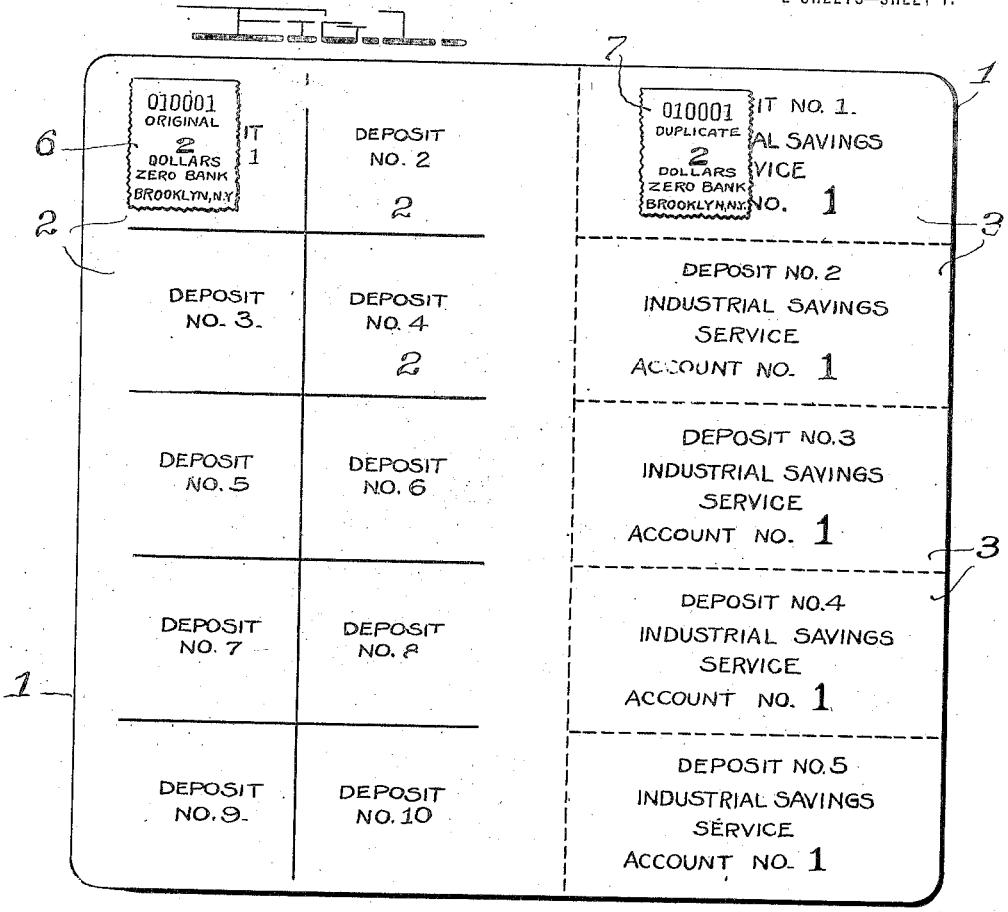

1,395,156.

Patented Oct. 25, 1921.
2 SHEETS—SHEET 2.

UNITED STATES PATENT OFFICE.

ORLAND V. SMITH, OF MILFORD, CONNECTICUT, ASSIGNOR, BY MESNE ASSIGNMENTS, OF ONE-HALF TO EDWARD L. ROBERTS, OF AMARILLO, TEXAS.

AUXILIARY BANKING MEANS.

1,395,156. Specification of Letters Patent. Patented Oct. 25, 1921.

Application filed November 25, 1918. Serial No. 263,950.

*To all whom it may concern:*

Be it known that I, ORLAND V. SMITH, a citizen of the United States, residing at the town of Milford, in the county of New Haven, State of Connecticut, have invented certain new and useful Improvements in Auxiliary Banking Means; and I do declare the following to be a full, clear, and exact description of the invention, such as will enable others skilled in the art to which it appertains to make and use the same.

This invention relates to an auxiliary banking system such as may be used, without conflict with the statutes which interdict the establishing of branches by National and savings banks and trust companies.

The main object of the invention is to prevent the crowded condition of such banks and companies such as now prevails owing to the multitude of small depositors, and to save the time of the latter as well as of the bank officials during banking hours, by enabling the depositor to do his banking business at the factory or other place where he is employed.

With these ends in view the invention consists in providing a specially devised bank pass book to be used in connection with a series of special stamps printed in couplets, each couplet comprising an original and a duplicate serially numbered and bearing the amount of deposit as well as the name of the bank in which deposits are to be made.
Further details of the invention will be apparent from the following description and the appended claims.

In the accompanying drawing—

Figure 1 is a view of my improved pass book opened to show stub spaces for original deposit stamps and detachable coupons corresponding with such stub spaces for the duplicate deposit stamps.

Fig. 2 is a view of a page at the rear of the book whereon is noted the initial deposit and on which the depositor's account is written up from time to time as may be desired.

Fig. 3 is a view of a stub and coupon card such as is used, on opening an account, and Fig. 4 is a view of the series of original and duplicate deposit stamps printed and connected in couplets.

Referring to the drawings, 1 denotes generally the pass book which is preferably composed of five sheets each of which is divided into ten spaces 2, in the nature of stubs, in which spaces are affixed the original deposit stamps. These spaces throughout the book are preferably serially numbered, there being fifty of such spaces all told to provide for fifty separate deposits.

Each of these five sheets is followed by two sheets which contain the detachable coupons 3 corresponding to the ten spaces, to which coupons the duplicate deposit stamps are affixed, said coupons being preferably serially numbered to correspond with the serial numbering of the spaces aforesaid, and each coupon bearing the particular number of the account, and in the present instance, the coupons indicate that the number of the depositor's account is "No. 1."

This arrangement of stub and coupon sheets is found to be quite convenient, although it will be clear that the pass book might be made up of stubs and coupons one or more to the page, as might suit the fancy of the bank, it being merely necessary in this invention that the deposit coupons should be properly identified with the number of the account.

The stub and coupon card shown at Fig. 3 is merely employed in opening an account, and on both the coupon 4 and stub 5 is noted the date of the first deposit, its amount, and the name of the depositor. Furthermore, the coupon card bears the signature of the depositor and such other means of identification as in usually required by a bank on opening an account.

At Fig. 4 is illustrated the deposit stamps which are printed in couplets and preferably in strip form, and are furnished coiled on any suitable reel or drum from which they are drawn from time to time as needed.

Each couplet of these stamps comprises an original 6 and a duplicate 7, and each of these bears the same serial number and indicates the amount of the deposit, and preferably bears the name of the bank in which the deposit is made. Successive couplets of the same deposit valuation are identical with the exception that they progress as to serial numbering.

In opening an account, a depositor goes to a proper official (not a bank official) at the place where he is employed, fills out the coupon card, shown at Fig. 3, and hands to such official the amount of his initial deposit, say $5.

The official then sends this amount together with the coupon card to the bank and hands the stub to the depositor as a receipt.

The bank then issues a pass book which bears the account number on the deposit coupons, and this number is likewise placed on the identification card. In the back of the book on the page illustrated at Fig. 2, the bank places the date of the deposit, the name of the depositor, and of the employer, and also the amount of the deposit carried out to show a balance equal to such amount, all as shown at Fig. 2.

The bank then sends this pass book to the official who delivers it to the depositor in exchange for the stub held by the latter, and this stub may be destroyed since it is now of no particular value.

On making subsequent deposits, the depositor hands his money to the official at the place where he is employed, and such official places in the space marked "Deposit No. 1" the original stamp of a couplet, and likewise places on the coupon that is identified with such space the duplicate stamp of the couplet which stamp indicates the amount of the particular deposit at that time; the official then tears out the coupon and sends it as a deposit slip together with the amount of the deposit to the bank and returns the pass book to the depositor, and since this coupon bears the number of the account, the bank enters up the deposit in its ledger account.

In making subsequent deposits the same procedure is gone through with, and in this connection, it might be well to remark that the strips of stamp couplets are preferably printed in different colors according to the deposit value of the stamps themselves, so that should subsequent deposits be more or less, stamps of varied colors will appear in the pass book and on the coupons, and since a mere glance at the color of the stamps will determine their deposit value, the latter need not be specifically indicated, and the work of both the employer official and the bank is somewhat simplified.

It will, of course, be understood that the serial numbering of the stamp couplets as well as the marking of the words "Original" and "Duplicate" on such stamps avoids confusion and amply protects both the depositor and the bank.

Should the depositor lose his pass book and should the pass book subsequently be handed into the bank for the purpose of withdrawing money by an unauthorized person, the bank will readily detect the fraud.

When an account is to be written up, the depositor, through the official at his place of employment, delivers his pass book to the bank and the account is written up on the page or pages corresponding to that shown at Fig. 2, and the stamps in the stub deposit places corresponding with the stamps on the coupons held by the bank are cancelled and the pass book then delivered by the bank to the depositor through said official.

Likewise in withdrawing amounts from the bank, the depositor, through said official, delivers his pass book to the bank together with the check for the amount withdrawn, and the bank then notes on the page or pages corresponding to Fig. 2 the amount of withdrawal and then returns the pass book together with the money withdrawn to said official who delivers it to the depositor.

It will thus be noted that the stamps affixed to the stub spaces and their corresponding coupons bear similar marks of identification so that neither of the stamps of the couplet can be improperly used without ready detection, and, furthermore, that the deposit coupons and that part of the book retained by the depositor bear a common designating mark, namely, the number of the account.

There is no writing or cancellation or the like of any nature whatsoever done by the officer at the place of employment and the present invention fully complies with the statutes which interdict the establishing of branches by savings and National banks and trust companies.

It is preferred to number the stub spaces and coupons by corresponding and progressive serial numbers, but the omission of these numbers will in no wise detract from the reliability of the invention, and the invention is not limited in this respect.

Also, while the marking of the stamps of each couplet by the words "Original" and "Duplicate" has its advantages and is preferred, this marking is not absolutely necessary owing to the identity of the serial numbering of such stamps.

What is claimed is:—

1. A device for evidencing bank deposits and credits including adhesive stamps of definite denominations printed in couplets of progressive serial number, the two stamps of each couplet being of like denomination and serial number, one adapted for attachment to the depositor's pass book and the other to the deposit slip.

2. A device for evidencing bank deposits and credits including adhesive stamps of divers denominations printed in couplets of original and duplicate, the two stamps of each couplet being of like denomination and serial number, the couplets of a given denomination having progressive serial numbers and printed in a distinctive color to afford ready identification, one adapted for attachment to the depositor's pass book and the other to the deposit slip.

3. A device for effecting savings bank deposits and credits, comprising, in combination with a pass-book to be retained by the depositor and including detachable deposit slips to be delivered with the deposit to the bank, stamps printed in couplets of different denominations, the two stamps of each couplet being of like denomination and serial number, one for attachment to the pass book and the other to the deposit slip to accompany the deposit of a sum corresponding to the denomination of the stamp.

4. A checking device for attachment to separate but dependent records and including a strip of adhesive stamps of corresponding character printed in couplets of progressive serial number, the two stamps of each couplet being of like serial number and separable for individual attachment, whereby bank deposits may be safely effected through an intermediary, one stamp of the couplet being attached to the depositor's pass book and the other to the bank deposit slip.

5. A checking device for attachment to separate but dependent records and including a strip of stamps of corresponding character printed in couplets of progressive serial number, the two stamps of each couplet being of like serial number and separable for individual attachment, whereby one stamp of the couplet may be attached to one record and the other to the other dependent record.

6. A device for effecting savings bank deposits and credits, comprising, in combination with a numbered pass-book to be retained by the depositor and including detachable deposit slips having a corresponding account number to be delivered with the deposit to the bank, strips of stamps printed in couplets of progressive serial number and denominations, and bearing the name of the bank, the two stamps of each couplet being of like denomination and serial number, one for attachment to the pass-book and the other to the deposit slip to accompany the deposit of a sum corresponding to the denomination of the stamp.

In testimony whereof I affix my signature.

ORLAND V. SMITH.